(12) United States Patent
Wittmeier, II et al.

(10) Patent No.: US 6,249,632 B1
(45) Date of Patent: *Jun. 19, 2001

(54) FIBER OPTIC SPLICE CLOSURE INCLUDING END PIVOTING SLACK STORAGE HOLDER AND ASSOCIATED METHODS

(76) Inventors: David Arthur Wittmeier, II, rue Leon de Lantsheere, 14, 1040 Brussels (BE); William Keith Heisey, 1321 Brompton La., Garner, NC (US) 27529; Jean-Pierre Wandels, Steenweg op Jette 172, B-1081 Koekelberg (BE); Christopher Radelet, Koestraat 41, B-3270 Scherpenheuvel (BE); Robert Vanhentenrijk, Ellestraat 28D, B-3020 Winksele (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/189,912

(22) Filed: Nov. 12, 1998

(51) Int. Cl.$^7$ .......................................................... G02B 6/36
(52) U.S. Cl. ........................... 385/135; 385/136; 385/137
(58) Field of Search ...................................... 385/135–137

(56) References Cited

U.S. PATENT DOCUMENTS

| 4,359,262 | 11/1982 | Dolan | 350/96.2 |
|---|---|---|---|
| 4,679,896 | 7/1987 | Krafcik et al. | 350/96.2 |
| 4,805,979 | 2/1989 | Bossard et al. | 350/96.2 |
| 5,323,480 | * 6/1994 | Mullaney et al. | 385/135 |
| 5,553,186 | * 9/1996 | Allen | 385/135 |
| 5,644,671 | 7/1997 | Goetter et al. | 385/135 |
| 5,692,299 | 12/1997 | Daems et al. | 29/869 |

FOREIGN PATENT DOCUMENTS 0 872 750 A2   4/1998  (EP) .

OTHER PUBLICATIONS

RXS/Siemens Product Brochure, "Canister Closure For Fiber–Optic Cables UCTL VIP A," Installation Instructions, Issue 1, Feb. 1998.

* cited by examiner

Primary Examiner—Hemang Sanghavi
(74) Attorney, Agent, or Firm—Allen, Dyer, Doppelt, Milbrath & Gilchrist, P.A.

(57) ABSTRACT

A fiber optic splice closure includes a housing, a support within the housing, at least one splice organizer pivotally connected to the support, and a slack storage holder pivotally connected to the support. The housing preferably has opposing ends and at least one cable port therein for receiving at least one fiber optic cable therethrough. The housing also includes sides extending between the opposing ends, and includes first and second mating housing portions detachably secured together. The support may be connected to an interior of the first housing portion adjacent end thereof. The support preferably includes portions defining a plurality of pivotal mounting locations. The slack storage holder is pivotally connected at a first pivotal mounting location of the support and is pivotally movable between a stored position and a raised position. The slack storage holder when in the stored position is preferably generally parallel to and in spaced apart relation from adjacent interior portions of the first housing portion. Accordingly, the slack storage holder thus preferably defines a fiber routing area with adjacent housing portions. The slack storage holder can be moved to the raised position facilitating access to the fiber routing area.

35 Claims, 5 Drawing Sheets

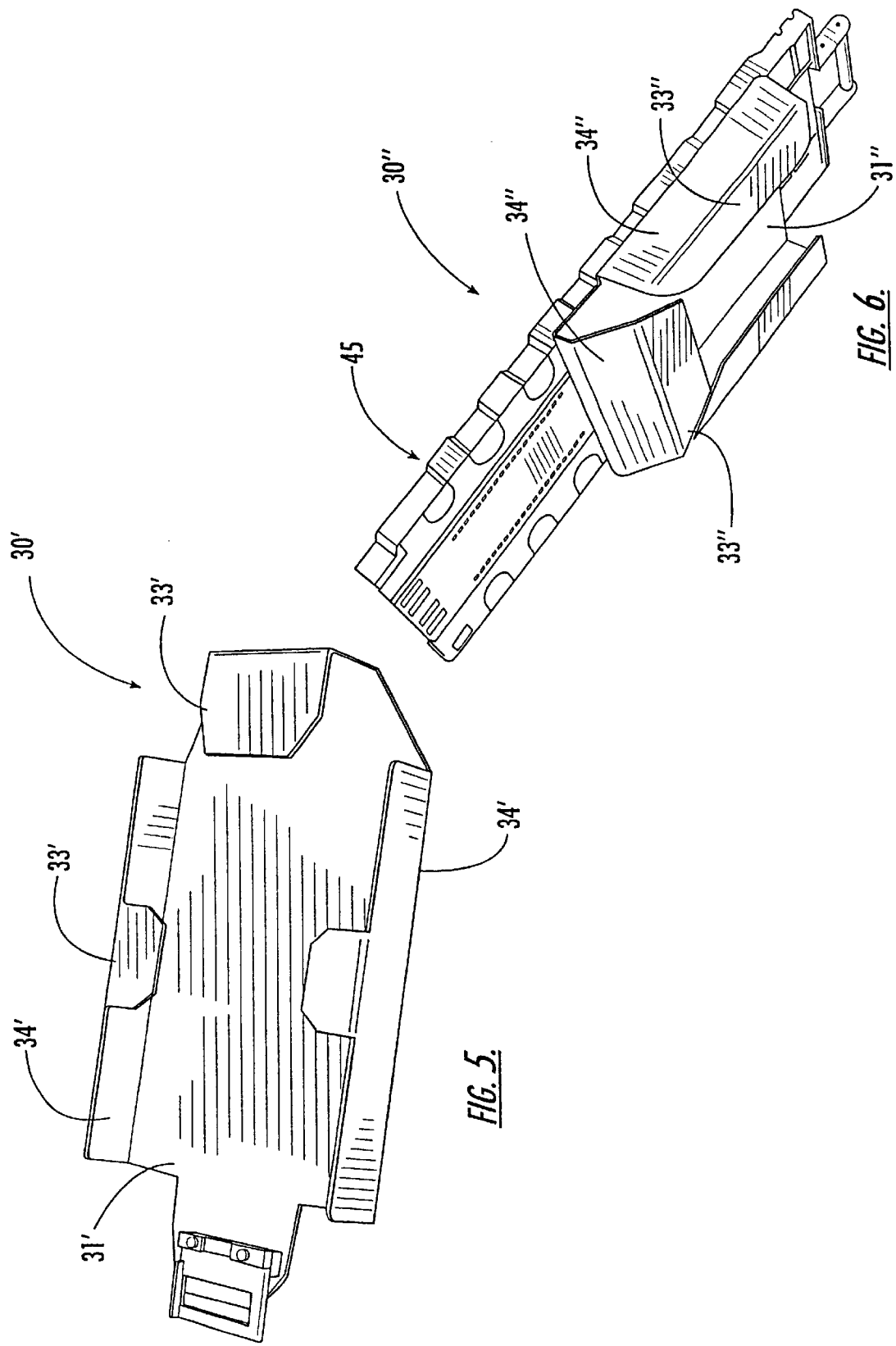

FIBER OPTIC SPLICE CLOSURE INCLUDING END PIVOTING SLACK STORAGE HOLDER AND ASSOCIATED METHODS

FIELD OF THE INVENTION

The invention relates to the field of optical communications, and, more particularly, to a fiber optic splice closure and associated methods.

BACKGROUND OF THE INVENTION

Fiber optic cables are widely used to transmit communications signals over relatively long distances. A typical fiber optic cable includes a central core including a plurality of buffer tubes each, in turn, containing a plurality of individual optical fibers. The core also typically includes a central strength member. An outer plastic jacket may be provided over the core. Some cables may include a metallic layer beneath the plastic jacket to prevent rodent damage. Another type of cable includes optical fiber ribbons within an overall sheath. Each ribbon includes a plurality of individual fibers joined together in side-by-side relation.

Although an optical fiber cable can carry signals over relatively long distances without requiring repeaters, one common architecture includes one or more drop locations along a main cable route. In other words, it may be desirable to connect certain fibers to drop cables along the main cable route. Each such drop or splice point requires the protection of the cable ends and individual splices. More particularly, a splice closure is typically provided for terminating the cables and storing the splices.

U.S. Pat. No. 4,679,896 to Krafcik, for example, discloses a so-called butt splice closure wherein the ends of two cables to be spliced together are routed through one end plate of a generally cylindrical housing. The housing is provided by a pair of generally circular end plates, and a tubular cover connecting the two end plates. Raychem, the assignee of the present invention also manufactures butt splice closures wherein the cables to be spliced are brought in from a single end of the housing. A series of pivotally mounted splice organizers are provided. The pivotally connected splice organizers permit organizers to be moved to a raised position to facilitate access to an underlying organizer. A fixed slack basket may be positioned under the splice organizers to store slack buffer tubes, for example.

Another general type of splice closure is the in-line closure wherein cables enter the overall housing from opposing ends. An in-line splice closure may be particularly desirable for a drop or branch cable location where the main cable includes a significant number of fibers that can pass through the closure without requiring splicing. Only those fibers that need to be dropped are spliced and the remaining fibers can be stored within the housing.

For example, U.S. Pat. No. 4,805,979 to Bossard et al. discloses such an in-line fiber optic splice closure. The closure includes two mating shell portions which are secured together to define an overall protective housing. Cable entry ports are provided at each end of the housing and are defined by arcuate wall portions between the base and cover housing portions. A slack storage area is defined in the base by a pair of inwardly extending retaining brackets connected at a medial portion of the base. The cable ends are terminated adjacent the cable ports. A series of splice organizers are connected to the base above the slack storage area. Each splice organizer stores a number of individual fiber splices.

Unfortunately, access to the slack after the splice organizers are secured is restricted. The splice organizers must be carefully removed to prevent damage to the fibers to gain access to the stored slack. Re-access is typically required to add additional fiber drops, for example, such as to add a new user or increase the capacity of an existing user.

A splice closure is also desirably relatively compact and rugged for installation in any of a number of locations, such as in a manhole, on a supporting pole, or direct buried. A compact closure may also be less expensive to manufacture, since less materials may be required.

SUMMARY OF THE INVENTION

In view of the foregoing background, it is therefore an object of the present invention to provide a fiber optic splice closure and associated method that provides a compact arrangement for the routing of spliced fibers, provides slack storage, and provides splice organizers for the splices.

It is another object of the invention to provide such a splice closure that facilitates re-entry and access to slack fibers, such as to permit additional fibers to be dropped at a location.

These and other objects features, and advantages in accordance with the present invention are provided by a splice closure comprising a housing, a support within the housing adjacent an end thereof, at least one splice organizer pivotally connected to the support, and a slack storage holder pivotally connected to the support. More particular, the housing preferably has opposing ends and at least one cable port therein for receiving at least one fiber optic cable therethrough. The housing also has opposing sides extending between the ends, and preferably includes first and second mating housing portions detachably secured together. The support may be connected to an interior of the first housing portion adjacent an end thereof.

The support preferably includes portions defining a plurality of pivotal mounting locations. The slack storage holder is preferably pivotally connected at a first pivotal mounting location of the support and is pivotally movable between a stored position and a raised position. Moreover, the slack storage holder when in the stored position is preferably generally parallel to and in spaced apart relation from adjacent interior portions of the first housing portion. Accordingly, the slack storage holder thus preferably defines a fiber routing area with adjacent housing portions. The slack storage holder can be moved to the raised position facilitating access to the fiber routing area.

The housing defines a longitudinal housing axis, and the pivoting arrangement of the slack storage tray defines a pivot axis generally transverse to the longitudinal housing axis. The pivoting arrangement of the slack storage holder permits the slack to be conveniently stored and handled, permits a compact housing construction, and permits access to the underlying fiber routing area. The fiber routing area would typically permit routing of fiber transport tubes containing individual fibers, from the cable ends to the desired splice organizers.

The at least one splice organizer may also be pivotally connected to the support at a pivotal mounting location above the first pivotal mounting location. The at least one splice organizer when in the stored position is also preferably generally parallel with adjacent housing portions.

In one embodiment, the slack storage holder preferably comprises a base panel and wall portions extending outwardly therefrom. The orientation of the slack storage holder is such as to define an access direction from above for positioning slack fibers therein. In other words, the splice organizers are moved to the raised position to obtain access to the open side of the slack storage holder.

In another embodiment, the slack storage holder is oriented so that the access direction is from below for positioning slack fibers. In other words, the access opening defined by the slack storage holder faces downward toward the first housing portion.

In accordance with another variation of the invention, a splice organizer may be secured to the base panel of the slack storage holder. Accordingly, the splice organizer may have an end pivotally connected to the support and the splice holder is carried by the splice organizer.

A method aspect of the invention is for making a fiber optic splice closure comprising a housing including a pair of first and second mating housing portions. The method preferably comprises the steps of: providing a support within the housing adjacent an end thereof, the support including portions defining a plurality of pivotal mounting locations; and pivotally connecting a slack storage holder at a first pivotal mounting location of the support to be pivotally movable between a stored position and a raised position. The slack storage holder when in the stored position is in spaced apart relation from adjacent interior portions of the housing to define a fiber routing area therebetween. The slack storage holder when in the raised position facilitating access to the fiber routing area.

The method also preferably includes the step of pivotally connecting at least one splice organizer to the support at a pivotal mounting location adjacent the first pivotal mounting location. The at least one splice organizer is pivotally movable between stored and raised positions.

BRIEF DESCRIPTION OF THE DRAWINGS

FIG. 5 is a bottom perspective view of an alternate embodiment of a slack storage holder to be used in the splice closure in accordance with the present invention.

FIG. 6 is a top perspective view of another embodiment of a splice storage holder in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and double prime designations are used to indicate similar elements in alternate embodiments.

Figure 1:
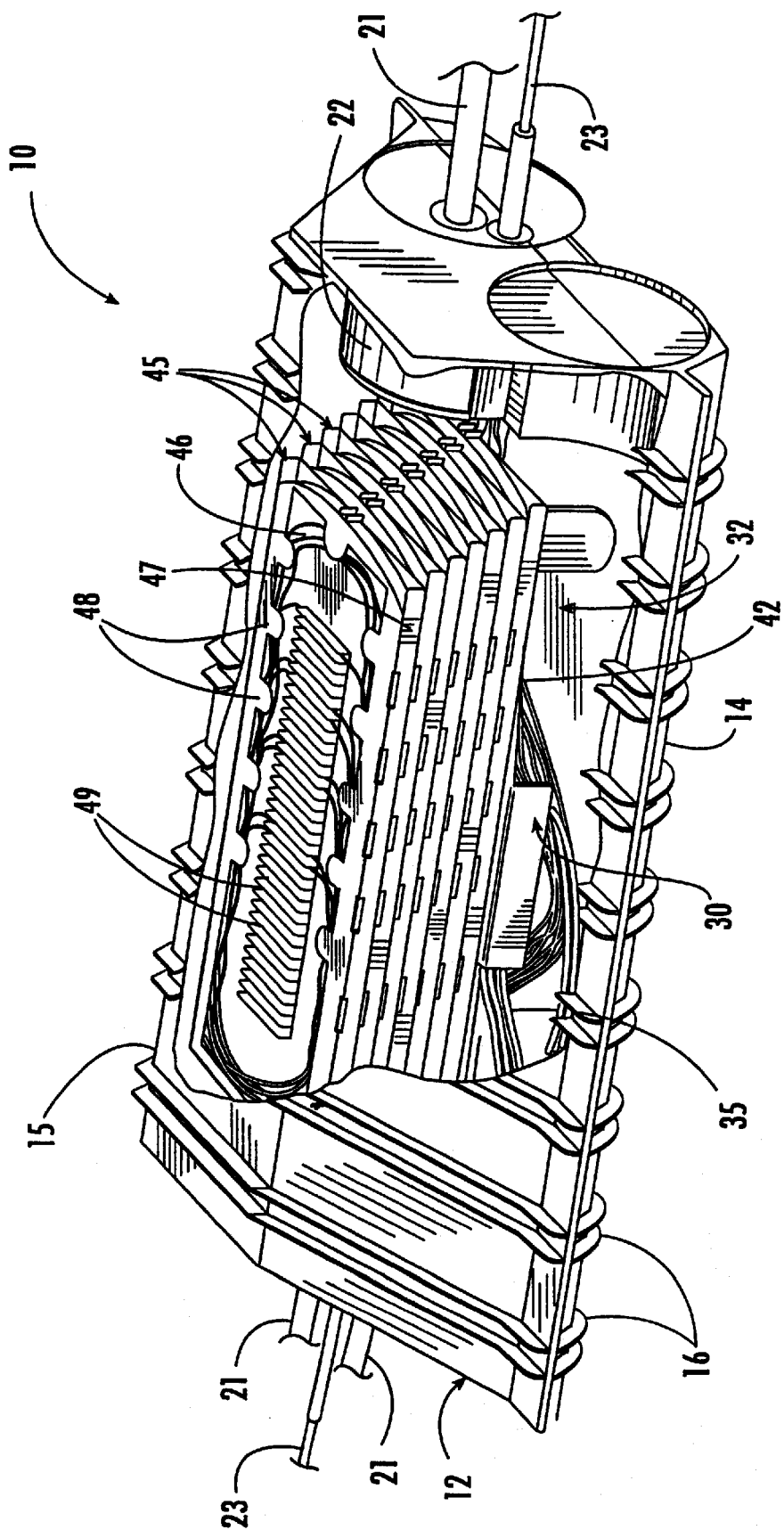
FIG. 1 is a perspective fragmentary view of the splice closure in accordance with the present invention.
Figure 2:
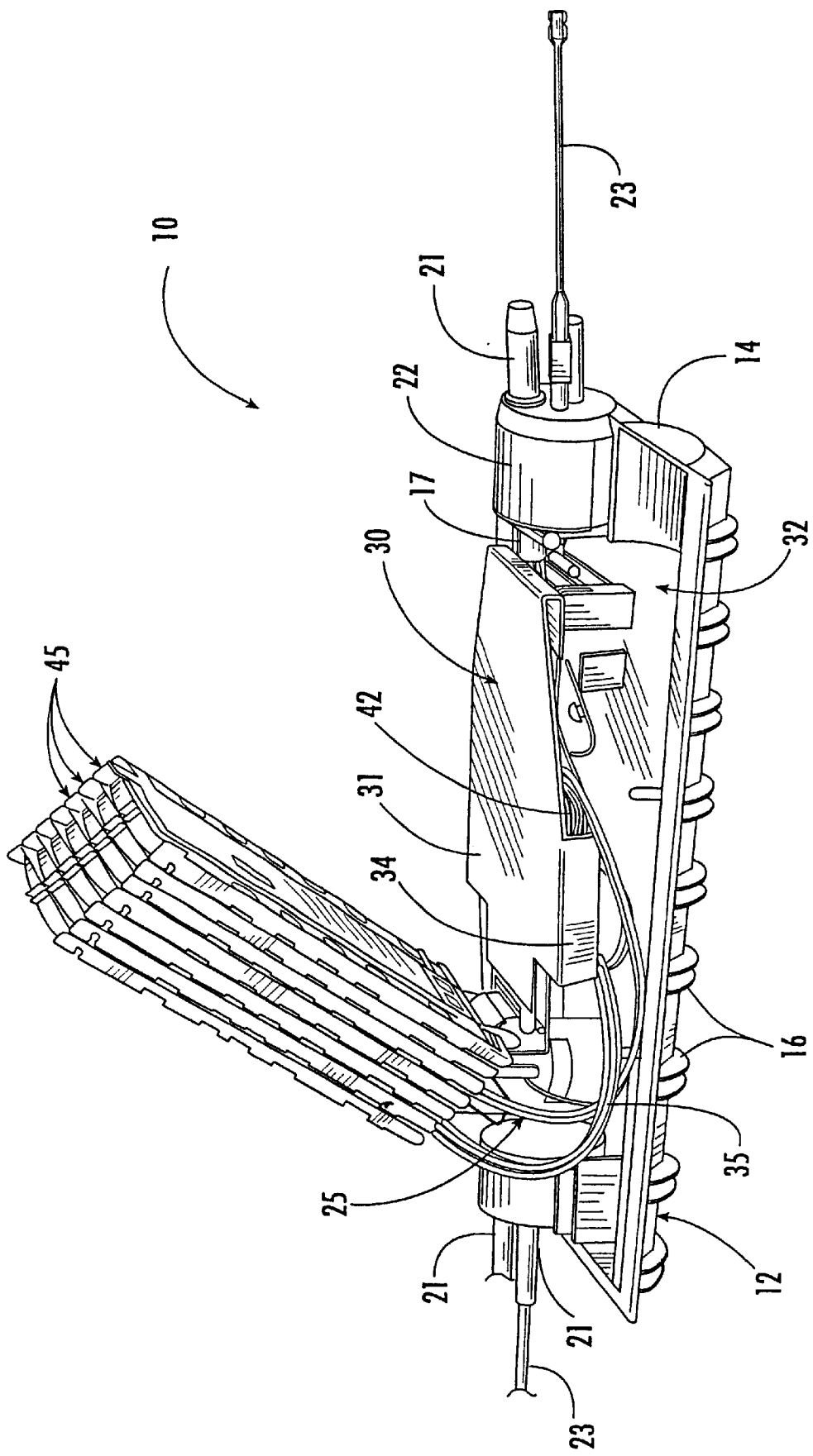
FIG. 2 is a perspective view of the splice closure of FIG. 1 with the cover removed for clarity and illustrating the splice organizers in the raised position.
Figure 3:
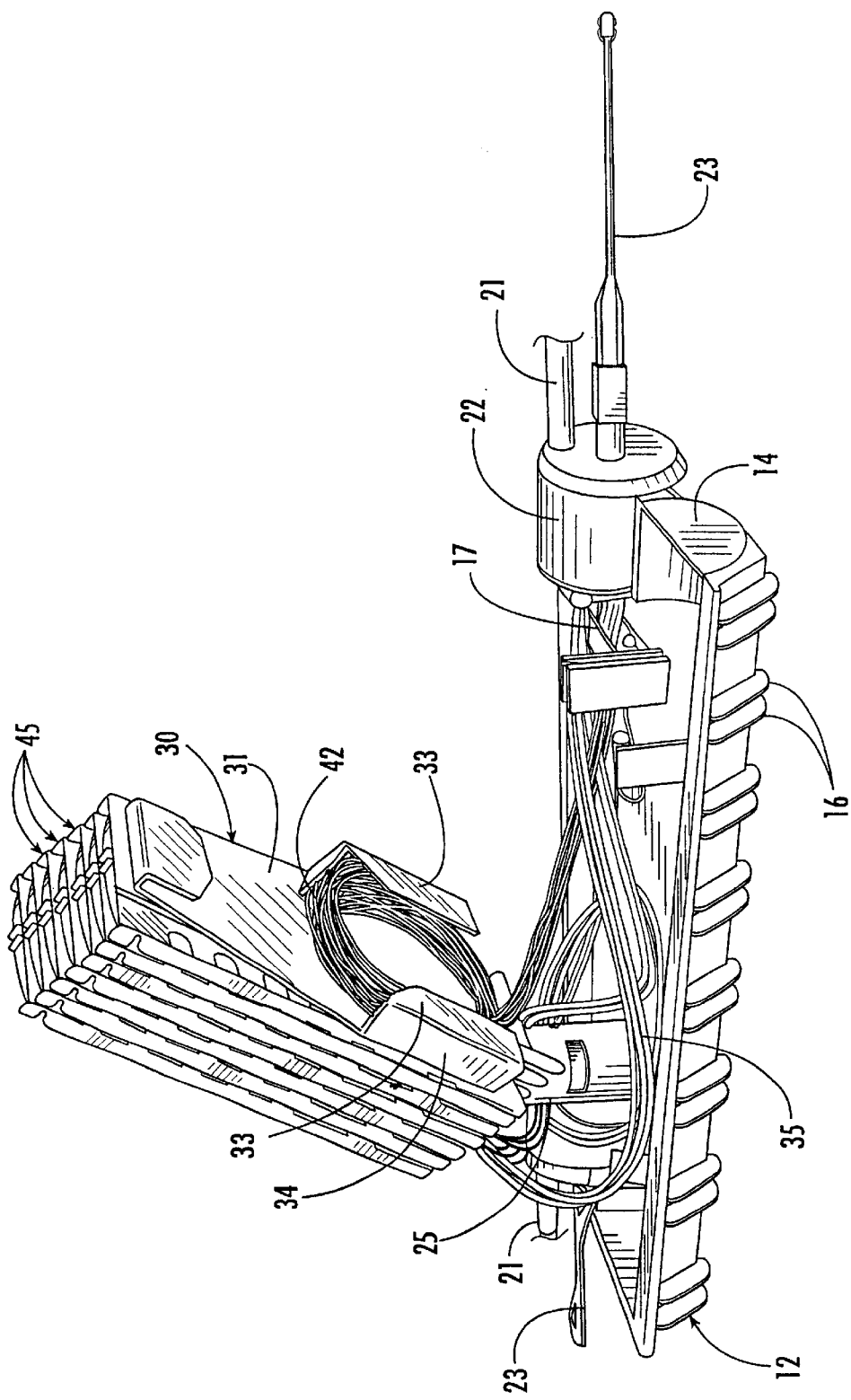
FIG. 3 is a perspective view of the splice closure of FIG. 1 with the cover removed for clarity and illustrating the splice organizers and the slack storage holder in the raised position.

Turning now to FIGS. 1–3, an embodiment of the splice closure 10 in accordance with the invention is first described. The splice closure includes a housing 12 comprising first and second mating housing portions 14, 15. In the illustrated embodiment, the housing 12 has an elongate generally rectangular shape. In addition, the first housing portion 14 has a lesser height than the second housing portion 15, and the first housing portion may be considered a base, while the second housing portion may be considered a cover. Accordingly, the first and second housing portions 14, 15 are alternately referred to herein as the base and cover, respectively. Those of skill in the art will readily appreciate that in other embodiments, the base 14 and cover 15 may have equal dimensions to define a symmetrical housing. However, the illustrated arrangement of the base 14 and cover 15 may provide better access to the fibers, splices, etc. as will be appreciated more fully based upon the following description.

The base 14 and cover 15 be may formed of molded rugged plastic material as will be readily appreciated by those skilled in the art. Peripheral flanges are defined in the base 14 and housing 15 to provide an environmental seal between the two housing portions. Reinforcing ribs 16 may also be provided on the base 14 and cover 15. A suitable gasket or compressible elastomeric seal, not shown, may be used between the base 14 and cover 15 in some embodiments. Removable fasteners, such as bolts, not shown, may be used to removably or detachably secure the base 14 and cover 15 together. Other removable fasteners are also contemplated by the invention as will be appreciated by those skilled in the art.

The illustrated housing 12 has opposing ends integrally formed from the opposing mating end portions of the base 14 and cover 15. Extending longitudinally between the ends are opposing side portions also provided by integrally formed respective mating portions of the base 14 and cover 15. The cable entry ports each receive a respective fiber optic cable therein.

In the illustrated embodiment an end seal unit 22 is provided within the enlarged cable entry port. The end seal unit is generally cylindrical and includes four passageways through which up to four individual fiber optic cables 21 may be positioned. The end seal unit 22 includes a body of compressible material retained between two rigid plates. A mechanism is provided whereby rotating the outwardly extending rod 23 may be used to move the plates together. Accordingly, the compressible material is caused to expand outwardly and form a tight seal with the adjacent housing portions as will be readily appreciated by those skilled in the art. In other embodiments other end sealing arrangements may be used as will also be understood by those skilled in the art.

Termination means may be provided for terminating a strength member of each fiber optic cable 21 to the housing 12. In particular, a bracket and associated cable attachment/clamping hardware 17 are provided adjacent each cable entry port to secure the cable strength member and to ground a metallic cable shield if included in the cable, as will be readily understood by those skilled in the art.

A support 25 is illustratively connected to an interior of the base 14 adjacent an end thereof. The support 25 preferably includes portions defining a plurality of pivotal mounting locations as shown in the illustrated embodiment. The pivotal mounting locations may be provided by aligned openings for receiving a hinge pin therethrough, for example. Those of skill in the art will readily appreciate other equivalent arrangements. The support may be formed of rigid plastic or lightweight metal, for example. The support 25, in other embodiments and variations, may be carried by other portions of the housing, however, attachment to the end of the base 14 may provide for more convenient assembly and use of the splice closure 10.

A slack storage holder 30 is pivotally connected at a first or lowermost pivotal mounting location of the support 25 and is pivotally movable between a stored position (FIG. 2) and a raised position (FIG. 3). The slack storage holder 30 when in the stored position is preferably generally parallel to and in spaced apart relation from adjacent interior portions of the base 14. The slack storage holder 30 thus defines a fiber routing area 32 with adjacent housing portions. The slack storage holder 30 can be moved to the raised position facilitating access to the fiber routing area 32.

The fiber routing area 32 illustratively is used to route fiber transport tubes 35 from the cable ends to the respective splice organizers 45 as described in greater detail below. The transport tubes 35 carry the individual optical fibers to be spliced at the drop location as will be readily understood by those skilled in the art.

The pivoting arrangement of the slack storage holder 30 within the housing 12 permits the fiber slack to be conveniently stored and handled, permits a compact housing construction, and permits access to the underlying fiber routing area 32. The fiber slack is illustratively in the form of unsevered buffer tubes 42 from the main cable. These unsevered buffer tubes 42 carry the individual fibers that are passing through the splice closure 10 without being dropped or terminated as will be appreciated by those skilled in the art. In other embodiments, the slack may be in the form of optical fiber ribbons as will also be appreciated by those skilled in the art.

A plurality of splice organizers 45 are also illustratively pivotally connected to the support 25 at respective pivotal mounting locations above the first pivotal mounting location. As shown in the illustrated splice closure 10, the splice organizers 45 when in the stored position are also preferably generally parallel with adjacent housing portions. Each splice organizer 45 is in the form of a generally rectangular tray having opposing ends and opposing sides. An end of each generally rectangular splice organizer 45 is pivotally connected to the support 25. Detents or latches may be provided so that the user may cause the splice organizers 45 to temporarily lock in the raised position to thereby facilitate access to an underlying organizer, for example. The details of such detents, latches or other temporary locking structures will be readily appreciated by those skilled in the art without further explanation.

Each splice organizer 45 may also carry one or more splice holders 49 thereon. Such a splice holder 49 may be a molded plastic body including a plurality of side-by-side grooves or passageways therein to receive the corresponding fiber splices. The splice organizer 45 illustratively includes a base panel 46, sidewall portions 47 extending outwardly from the base panel, and a plurality of inwardly extending tabs 48 which serve to retain the fiber portions of the spliced fibers on the base panel.

In the illustrated splice closure 10, the slack storage holder 30 includes a base panel 31 and wall portions 34 extending outwardly therefrom. Inwardly extending tabs 33 are also provided to help retain the slack within the slack storage holder 30. The height of the wall portions 32 may be increased, if desired, to provide either more storage capacity or to accommodate optical fiber ribbons as will be readily appreciated by those skilled in the art. The orientation of the slack storage holder in the illustrated embodiment of FIGS. 1–3 is such as to define an access direction from below for positioning slack fiber buffer tubes therein. In other words, the splice organizers 45 and the slack storage holder 30 are moved to the raised position to obtain access to the open top side of the slack storage holder as perhaps best shown in FIG. 3.

Figure 4:
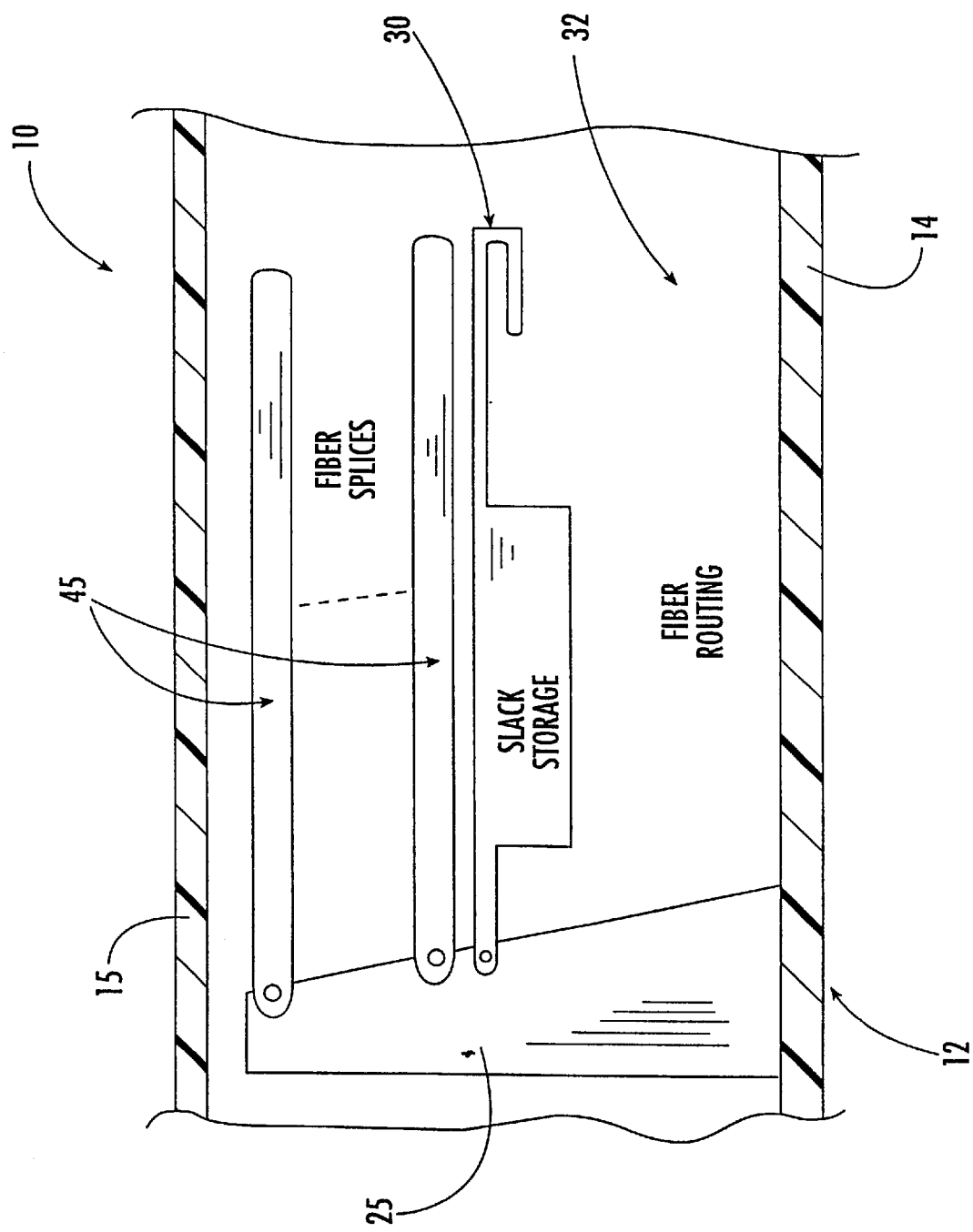
FIG. 4 is a schematic longitudinal cross-sectional view of the splice closure of FIG. 1 illustrating the different fiber areas within the housing.

Turning now briefly to the schematic longitudinal cross-sectional view of FIG. 4, several advantages of the splice closure 10 are highlighted. The splice closure 10 is relatively easy to use and defines three distinct areas within the housing 12 which not only facilitate original assembly, but which also facilitate re-entry, such as to permit the additional of drop fibers or re-routing. More particularly, the fiber routing area 32 has already been described and provides a convenient location for routing the transport tubes 35.

Above the fiber routing area 32, the slack storage holder 30 provides a convenient and compact area for storing slack buffer tubes 42, for example. The slack storage holder 30 may be pivoted to the raised position to facilitate access to the underlying transport tubes 35. Above the slack storage area, the splice organizers 45 provide a convenient and accessible area for the individual fiber splices as will be appreciated by those skilled in the art.

Referring now additionally to FIG. 5, another embodiment of a slack storage holder 30' in accordance with the invention is now described. This slack storage holder 30' may also be pivotally connected to the support 25 so that its access opening is accessible from below. In other words, the splice organizers 45 and the slack storage holder 30' are pivoted and locked in the raised position to permit access to the slack storage holder. Morever, in this embodiment, the slack storage holder 30' includes a splice organizer 45' secured to opposite side thereof. Accordingly, the splice organizer 45' may be pivotally connected to the support 25 and the slack storage holder 30' is thus pivotally connected and provides the various features and advantages as described extensively herein.

Turning now briefly to FIG. 6, another embodiment of a splice storage holder 30" is explained. This embodiment includes sidewall portions having a greater height, such as to accommodate a greater amount of slack or to accommodate optical fiber ribbons. In addition, this splice storage holder 30" may be mounted so that its access opening is accessible from above. In other words, the splice organizers 45 are moved to the raised position to access the splice storage holder 30". Of course, as will be readily appreciated by those skilled in the art, in other embodiments, the splice storage holder 30" can be inverted.

A method aspect of the invention is for making a fiber optic splice closure 10 as described above and comprising a housing 12 including a pair of first and second mating housing portions 14, 15. The method preferably comprises the steps of: providing a support 25 within the housing 12 adjacent a side thereof, the support including portions defining a plurality of pivotal mounting locations; and pivotally connecting a slack storage holder 30 at a first pivotal mounting location of the support to be pivotally movable between a stored position and a raised position. The slack storage holder 30 when in the stored position is in spaced apart relation from adjacent interior portions of the housing 12 to define a fiber routing area 32 therebetween. The slack storage holder 30 when in the raised position facilitates access to the fiber routing area 32. The method also preferably includes the step of pivotally connecting at least one splice organizer 45 to the support 25 at a pivotal mounting location adjacent the first pivotal mounting location. The at least one splice organizer 45 is also pivotally movable between stored and raised positions.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic splice closure comprising:
a housing having opposing ends and at least one cable port therein for receiving at least one fiber optic cable therethrough, said housing comprising first and second mating housing portions detachably secured together;
a support connected to an interior of the first housing portion adjacent an end thereof, said support including portions defining a plurality of pivotal mounting locations;
a slack storage holder being pivotally connected at a first pivotal mounting location of said support and being pivotally movable between a stored position and a raised position, said slack storage holder when in the stored position being generally parallel to and in spaced apart relation from adjacent interior portions of the first housing portion to define a fiber routing area therebetween, said slack storage holder when in the raised position facilitating access to the fiber routing area; and
at least one splice organizer being pivotally connected to said support at a pivotal mounting location above the first pivotal mounting location and being pivotally movable between stored and raised positions.

2. A fiber optic splice closure according to claim 1 wherein said housing defines a longitudinal housing axis; and wherein the pivotal connection of said slack storage holder defines a pivot axis transverse to the longitudinal housing axis.

3. A fiber optic splice closure according to claim 1 wherein said slack storage holder comprises a base panel and wall portions extending outwardly therefrom defining an access direction from above for positioning slack fibers therein.

4. A fiber optic splice closure according to claim 1 wherein said slack storage holder comprises a base and wall portions extending outwardly therefrom defining an access direction from below for positioning slack fibers therein.

5. A fiber optic splice closure according to claim 4 further comprising a splice organizer secured to the base of said slack storage holder.

6. A fiber optic splice closure according to claim 1 wherein the first housing portion has a height less than a height of said second housing portion so that said first housing portion serves as a base and the second housing portion serves as a removable cover.

7. A fiber optic splice closure according to claim 1 further comprising at least one splice holder on said at least one splice organizer.

8. A fiber optic splice closure according to claim 1 further comprising means for terminating a strength member of each fiber optic cable to said housing.

9. A fiber optic splice closure according to claim 1 wherein said housing has a generally elongate rectangular shape.

10. A fiber optic splice closure according to claim 1 wherein said at least one splice organizer has a generally rectangular shape.

11. A fiber optic splice closure comprising:
a housing having opposing ends and at least one cable port therein for receiving at least one fiber optic cable therethrough, said housing comprising first and second mating housing portions detachably secured together;
a support connected to an interior of the first housing portion adjacent an end thereof, said support including portions defining a plurality of pivotal mounting locations;
a slack storage holder being pivotally connected at a first pivotal mounting location of said support and being pivotally movable between a stored position and a raised position, said slack storage holder when in the stored position being generally parallel to and in spaced apart relation from adjacent interior portions of the first housing portion to define a fiber routing area therebetween, said slack storage holder when in the raised position facilitating access to the fiber routing area, said slack storage holder comprising a base and wall portions extending outwardly therefrom; and
at least one splice organizer being pivotally connected to said support at a pivotal mounting location above the first pivotal mounting location and being pivotally movable between stored and raised positions, said at least one splice organizer when in the stored position being generally parallel with adjacent housing portions.

12. A fiber optic splice closure according to claim 11 wherein said housing defines a longitudinal housing axis; and wherein the pivotal connection of said slack storage holder defines a pivot axis transverse to the longitudinal housing axis.

13. A fiber optic splice closure according to claim 11 wherein said base panel and wall portions of said slack storage holder define an access direction from above for positioning slack fibers therein.

14. A fiber optic splice closure according to claim 11 wherein said base and wall portions of said slack storage holder define an access direction from below for positioning slack fibers therein.

15. A fiber optic splice closure according to claim 14 further comprising a splice organizer secured to the base of said slack storage holder.

16. A fiber optic splice closure according to claim 11 wherein the first housing portion has a height less than a height of said second housing portion so that said first housing portion serves as a base and the second housing portion serves as a removable cover.

17. A fiber optic splice closure according to claim 11 further comprising at least one splice holder on said at least one splice organizer.

18. A fiber optic splice closure according to claim 11 further comprising means for terminating a strength member of each fiber optic cable to said housing.

19. A fiber optic splice closure comprising:
a housing having opposing ends;
a support within said housing adjacent an end thereof, said support including portions defining a plurality of pivotal mounting locations;
a slack storage holder being pivotally connected at a first pivotal mounting location of said support and being pivotally movable between a stored position and a raised position, said slack storage holder when in the stored position being in spaced apart relation from adjacent interior portions of said housing to define a fiber routing area therebetween, said slack storage holder when in the raised position facilitating access to the fiber routing area; and at least one splice organizer being pivotally connected to said support at a pivotal mounting location adjacent the first pivotal mounting location and being pivotally movable between stored and raised positions.

20. A fiber optic splice closure according to claim 19 wherein said slack storage holder when in the stored position is generally parallel with adjacent housing portions.

21. A fiber optic splice closure according to claim 19 wherein said housing defines a longitudinal housing axis; and wherein the pivotal connection of said slack storage holder defines a pivot axis transverse to the longitudinal housing axis.

22. A fiber optic splice closure according to claim 19 wherein said housing comprises a pair of first and second mating housing portions; wherein said support is connected to an interior of the first housing portion; and wherein the fiber routing area is between the first housing portion and the slack storage holder.

23. A fiber optic splice closure according to claim 19 wherein said slack storage holder comprises a base panel and wall portions extending outwardly therefrom defining an access direction from above for positioning slack fibers therein.

24. A fiber optic splice closure according to claim 19 wherein said slack storage holder comprises a base and side portions extending outwardly therefrom defining an access direction from below for positioning slack fibers therein.

25. A fiber optic splice closure according to claim 24 further comprising a splice organizer secured to the base of said slack storage holder.

26. A fiber optic splice closure according to claim 19 wherein said housing comprises a pair of first and second mating housing portions; and wherein the first housing portion has a height less than a height of said second housing portion so that said first housing portion serves as a base and the second housing portion serves as a removable cover.

27. A fiber optic splice closure according to claim 19 further comprising means for terminating a strength member of each fiber optic cable to said housing.

28. A fiber optic splice closure according to claim 19 wherein said housing has an elongate generally rectangular shape.

29. A method for making a fiber optic splice closure comprising a housing including a pair of first and second mating housing portions, the method comprising the steps of:

providing a support within the housing adjacent an end thereof, the support including portions defining a plurality of pivotal mounting locations;

pivotally connecting a slack storage holder at a first pivotal mounting location of the support to be pivotally movable between a stored position and a raised position, the slack storage holder when in the stored position being in spaced apart relation from adjacent interior portions of the housing to define a fiber routing area therebetween, the slack storage holder when in the raised position facilitating access to the fiber routing area; and pivotally connecting at least one splice organizer to the support at a pivotal mounting location adjacent the first pivotal mounting location and being pivotally movable between stored and raised positions.

30. A method according to claim 29 wherein the housing defines a longitudinal housing axis; and wherein the step of pivotally connecting the slack storage holder comprises pivotally connecting the slack storage holder so that a pivot axis is transverse to the longitudinal housing axis.

31. A method according to claim 29 wherein the step of pivotally connecting the slack storage holder comprises pivotally connecting the slack storage holder so that when in the stored position the slack storage holder is generally parallel with adjacent housing portions.

32. A method according to claim 29 wherein the step of pivotally connecting the at least one splice organizer comprises pivotally connecting the at least one splice organizer so that when in the stored position the at least one splice organizer is generally parallel with adjacent housing portions.

33. A method according to claim 29 wherein the support is connected to an interior of the first housing portion; and wherein the step of pivotally connecting the slack storage holder comprises pivotally connecting the slack storage holder so that the fiber routing area is between the first housing portion and the slack storage holder.

34. A method according to claim 29 wherein the slack storage holder comprises a base panel and wall portions extending outwardly therefrom defining an access direction from above for positioning slack fibers therein.

35. A method according to claim 29 wherein the slack storage holder comprises a base and side portions extending outwardly therefrom defining an access direction from below for positioning slack fibers therein.

* * * * *